(12) United States Patent
Johansson (10) Patent No.: US 9,157,546 B2
(45) Date of Patent: Oct. 13, 2015

(54) ELECTROMECHANICAL VALVE (71) Applicant: SO Elektronik AB, Haninge (SE)

(72) Inventor: Per-Ove Johansson, Trångund (SE)

(73) Assignee: SO Elektronik AB, Haninge (SE)

( * ) Notice: Subject to any disclaimer, the term of this patent is extended or adjusted under 35 U.S.C. 154(b) by 0 days.

(21) Appl. No.: 14/183,693

(22) Filed: Feb. 19, 2014

(65) Prior Publication Data

US 2014/0209824 A1    Jul. 31, 2014

Related U.S. Application Data (63) Continuation-in-part of application No. 12/663,280, filed as application No. PCT/SE2008/000343 on May 21, 2008, now Pat. No. 8,763,984.

(30) Foreign Application Priority Data

Jun. 20, 2007  (SE) ........................... 0701504
Apr. 29, 2008  (SE) ........................... 0800966

(51) Int. Cl.
*F16K 31/08*     (2006.01)
*F16K 31/06*     (2006.01)
*H01F 7/08*      (2006.01)
*H01F 7/16*      (2006.01)

(52) U.S. Cl.
CPC ........... *F16K 31/082* (2013.01); *F16K 31/0655* (2013.01); *F16K 31/0658* (2013.01); *F16K 31/0675* (2013.01); *H01F 2007/086* (2013.01); *H01F 2007/1676* (2013.01)

(58) Field of Classification Search
CPC ........... F16K 31/0655; F16K 31/0658; F16K 31/0675; H01F 2007/086; H01F 2007/1676

USPC ............ 251/129.06, 129.15, 129.16, 129.17; 310/22, 29; 335/279, 297
See application file for complete search history.

(56) References Cited

U.S. PATENT DOCUMENTS

| | | | | | |
|---|---|---|---|---|---|
| 2,550,297 | A | * | 4/1951 | Ray ........................... | 251/129.09 |
| 2,881,980 | A | * | 4/1959 | Goodrich et al. ............. | 239/562 |
| 2,911,183 | A | * | 11/1959 | Matthews et al. ........ | 251/129.02 |
| 3,921,670 | A | * | 11/1975 | Clippard et al. ......... | 137/625.65 |
| 4,076,045 | A | * | 2/1978 | Nakajima et al. ........ | 137/625.65 |
| 4,196,751 | A | * | 4/1980 | Fischer et al. ........... | 137/625.65 |
| 4,336,823 | A | * | 6/1982 | Staiger et al. ................. | 137/270 |
| 5,593,134 | A | * | 1/1997 | Steber et al. ............. | 251/129.17 |
| 5,628,491 | A | * | 5/1997 | Krone ........................ | 251/129.21 |
| 5,967,488 | A | * | 10/1999 | Redlich ........................ | 251/129.2 |
| 6,220,569 | B1 | * | 4/2001 | Kelly ........................ | 251/129.08 |
| 6,442,837 | B1 | * | 9/2002 | Haga et al. ............... | 29/890.124 |
| 6,550,745 | B2 | * | 4/2003 | Bergstrom et al. ...... | 251/129.16 |
| 6,676,106 | B2 | * | 1/2004 | Swartz et al. ............ | 251/129.01 |
| 6,737,946 | B2 | * | 5/2004 | Seale et al. .................... | 335/279 |
| 6,786,468 | B2 | * | 9/2004 | Schroeder ................ | 251/129.17 |
| 7,249,749 | B2 | * | 7/2007 | Niwa et al. ............... | 251/129.16 |
| 7,748,683 | B1 | * | 7/2010 | Kelly ....................... | 251/129.08 |

* cited by examiner

*Primary Examiner* — Matthew W Jellett (74) *Attorney, Agent, or Firm* — Piedmont Intellectual Property (57) ABSTRACT

An electromechanical valve includes, in a housing, a core of magnetic material surrounded by a coil to be supplied with excitation current, a valve seat attached to the housing with a space to the core, at least one outlet port in the valve seat and at least one inlet port communicating via the space, and a valve washer of magnetic material suspended in the space to close the outlet port in absence of excitation current to the coil, the valve washer cooperating with the core to open/close the outlet port when excitation current is supplied to the coil.

13 Claims, 14 Drawing Sheets

ELECTROMECHANICAL VALVE

TECHNICAL FIELD

The invention relates generally to valves and more specifically to an electromechanical valve.

BACKGROUND

Among disadvantages with today's electromechanical valves are low efficiency, long response times, dirt sensitivity, wearing, sticking and working medium leakage. Hence there exists a need for an improved electromagnetic valve.

SUMMARY

An object of the invention is to overcome or at least partly reduce the disadvantages with today's electromechanical valves and to provide an improved electromagnetic valve.

This object and others are attained by the electromechanical valve according to the present invention as set out in the appended claims.

In accordance with one embodiment the electromagnetic valve comprises a housing, a cup-shaped body of magnetic material having a centrally extending core surrounded by a coil to be supplied with excitation current, a valve seat attached to the housing with a space to said core, at least one centrally located outlet port in said valve seat and at least one inlet port communicating with said space, and a valve washer of magnetic material (suspended) arranged in said space to close said outlet port in absence of excitation current to said coil, said valve washer cooperating with said core to open said outlet port when excitation current is supplied to said coil.

In accordance with one embodiment the valve washer is formed by a multitude of layers adapted to generate a spring force when compressed. In particular the valve washer can be a washer of blade spring type formed by an electromagnetic material.

In one embodiment the core extends to the rim of the cup-shaped body.

In one embodiment said at least one inlet port is located radially from said at least one outlet port in said valve seat.

In one embodiment at least two spring ribs extend radially from said valve washer.

In one embodiment said valve washer has a stroke ≤2 mm in said space.

In one embodiment said coil has low inductance.

In one embodiment said coil is to be supplied with excitation current from a current source having current generator characteristics.

The electronic valve as described herein will provide a robust electromagnetic valve that can be controlled with short opening and closing time thereby enabling an accurate control of working medium flow and pressure.

BRIEF DESCRIPTION OF THE DRAWINGS

The invention will now be described in more detail by means of non-limiting examples and with reference to the accompanying drawings, in which.

DETAILED DESCRIPTION

Figure 1:
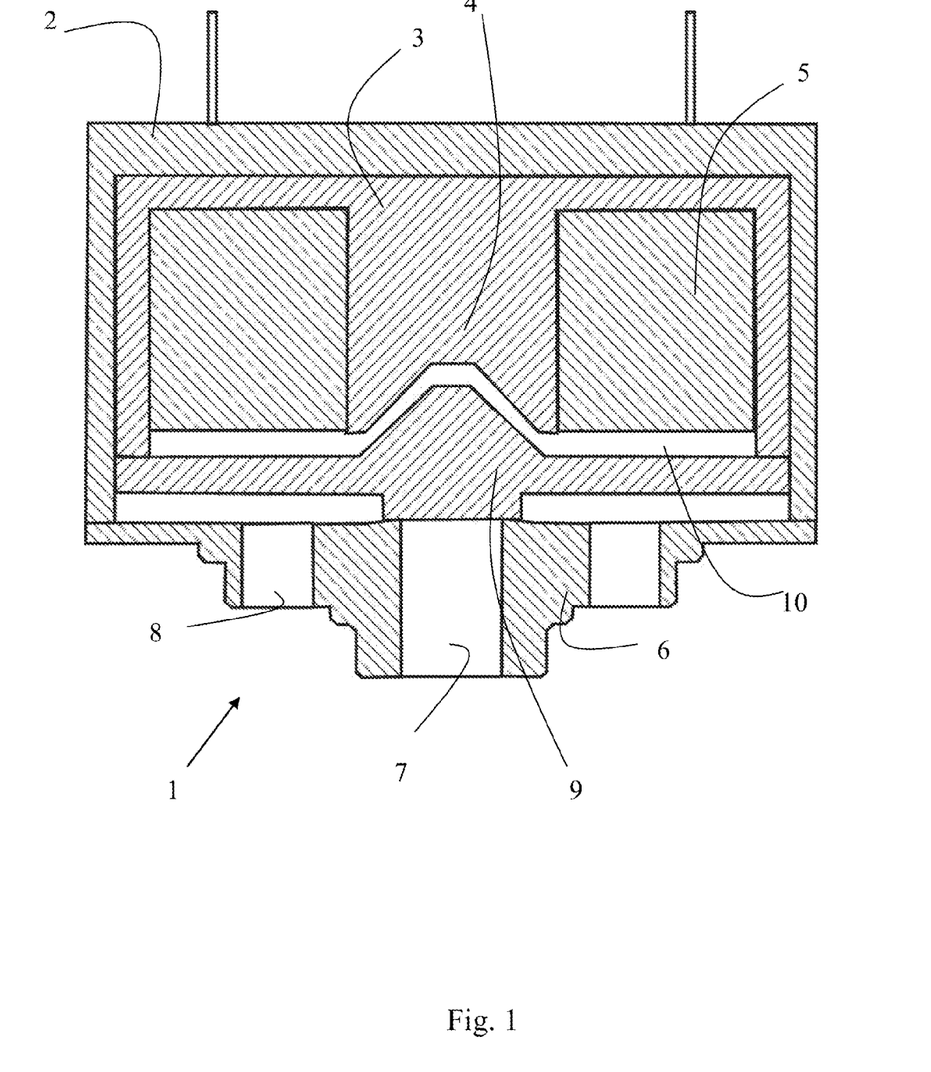
FIG. 1 is an axial section of an embodiment of an electromechanical valve according to the invention.

In FIG. 1, an axial section of an embodiment of an electromechanical valve 1, e.g. a pneumatic valve, is shown.

The valve 1 comprises a housing 2 of non-magnetic material, e.g. aluminium. Inside the housing 2 a core 3 of an electromagnetic material is located. The core 3 has a centrally extending portion 4 that is surrounded by a coil 5. In one embodiment the core 3 is generally cup-shaped. In one embodiment the core 3 can be E-shaped. Other shapes are possible.

In one embodiment, the centrally located portion 4 extends to the rim of the cup shaped electromagnetic core 3. It is however to be understood that the portion 4 may be shorter or longer than the height of the wall of the core.

The coil 5 is supplied with excitation current from a current source such as the one described below in conjunction with FIG. 13 via its terminals.

Preferably, the coil 5 has low inductance and the current source to be connected to the terminals has current generator characteristics.

A valve seat 6, also of non-magnetic material, e.g. aluminium, is attached, e.g. by means of screws (not shown), to the housing 2 with a space to the core 3.

The valve 1 further has an outlet port 7. In one embodiment, the valve seat 6 has a centrally located outlet port 7. In accordance with another embodiment more than one outlet port 7 is provided.

The valve 1 further comprises an inlet port 8. In accordance with one embodiment the valve 1 comprises two inlet ports 8 at a radial distance from the outlet port 7. The number of inlet ports can vary for different applications. At least one inlet port 8 is provided and more may be used.

The outlet port 7 and the inlet ports 8 are in communication via a space between the valve seat 6 and the core 3.

It is to be understood that the location of the inlet ports 8 is not restricted but that the location of the inlet ports 8 can depend on the intended use of valve 1 and can hence be located at any suitable location depending on the field of use of the valve 1.

In accordance with some embodiments a valve washer 9 of magnetic material is resiliently suspended in the space between the valve seat 6 and the core 3.

In accordance with one embodiment the washer 9 is suspended by spring ribs extending from the valve washer 9 to keep the outlet port 7 closed in absence of excitation current to coil 5.

In accordance with one embodiment the washer is formed by multiple layers of an electromagnetic material forming a blade spring whereby the washer does not need to be suspended but can provide the required spring force in itself. In other words the valve washer 9 is freely suspended in a space formed between the valve seat 6 and the core 3.

When excitation current is supplied to the coil 5, the valve washer 9 cooperates with, i.e. is attracted by, core 3 to open the outlet port 7.

The valve washer 9 in some embodiments, preferably, has a stroke ≤2 mm to keep dimension down.

Figure 2:
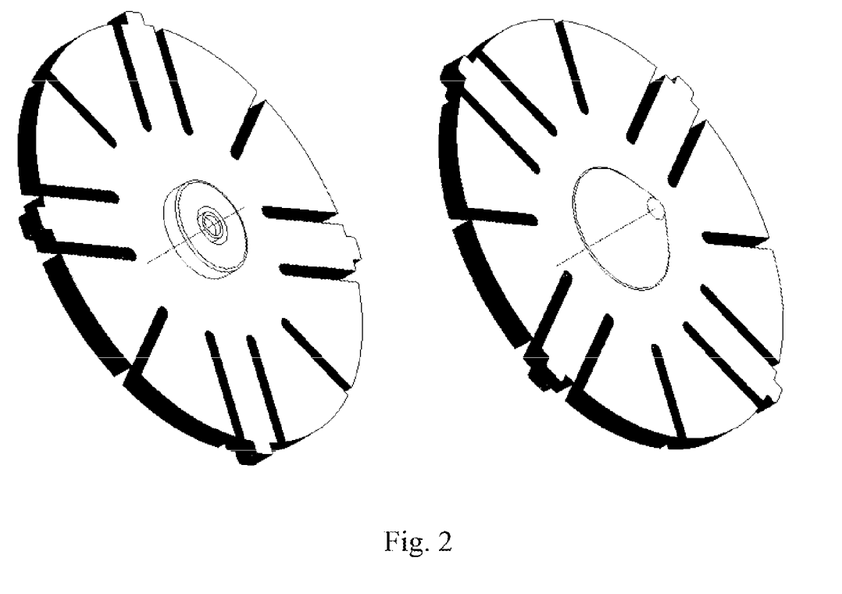
FIG. 2 is a perspective view of a first embodiment of a valve washer.

In FIG. 2 a perspective view from both sides of an embodiment of a valve washer 9 formed by multiple layers of an electromagnetic material is shown. The layers form a blade spring washer that enables the washer to return to its seat when the core is not excited by any electricity.

Figure 3:
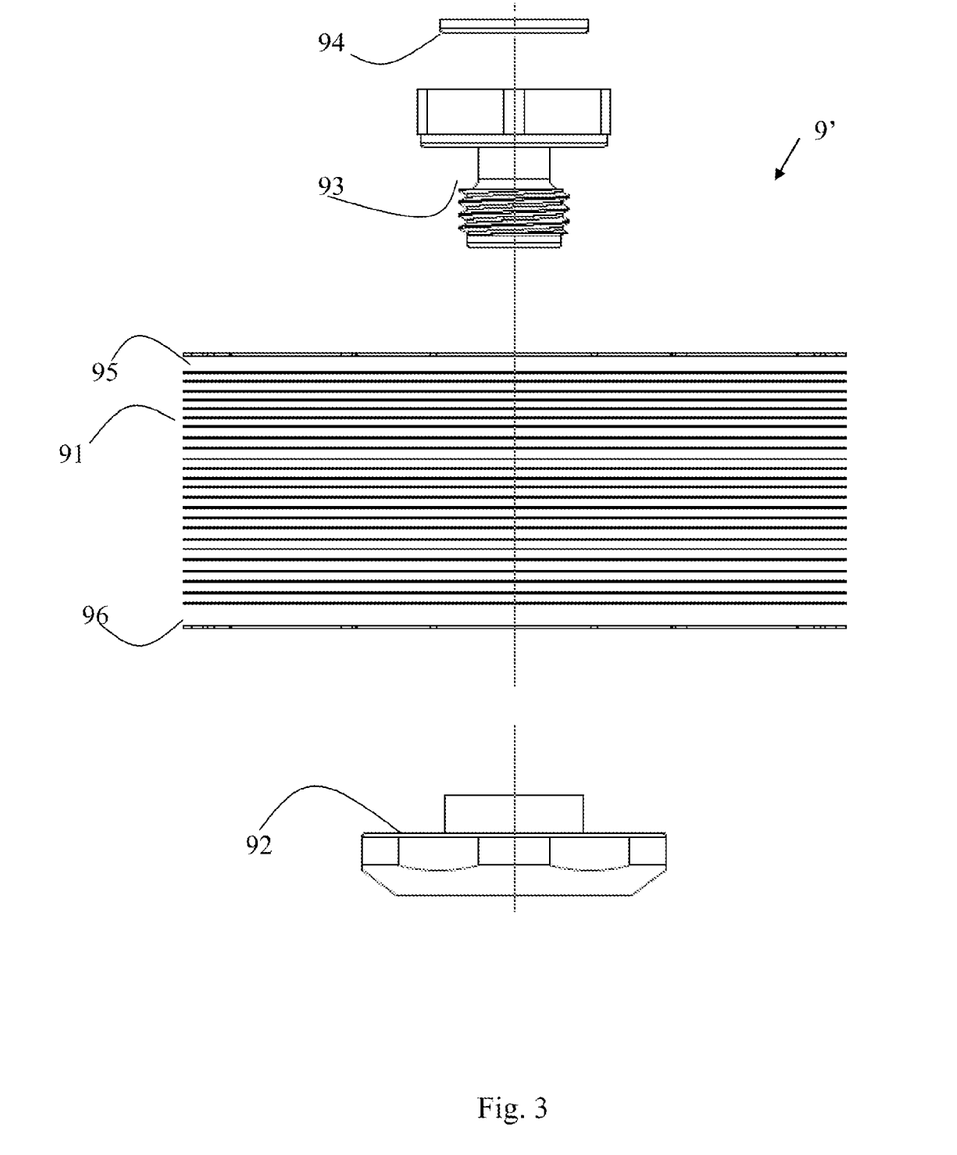
FIGS. 3-5 are exploded views of a valve washer according to a second embodiment.

In FIG. 3 an exploded view from the side of another embodiment of a valve washer 9' is shown. The valve washer 9' is formed by multiple layers of plates 91 of an electromagnetic material. The plates 91 that are stacked on top of each other form a blade spring washer that enables the valve washer to return to its seat when the core is not excited by any electricity. Each plate 91 is formed by a thin flexible sheet of soft magnetic material, e.g. a suitable type of stainless steel. The valve washer 9' further comprises a bolted joint formed by a nut 92 and a bolt 93. The bolt 93 can further have a sealing 94 formed by an elastic material attached thereto to enhance the seal against the valve seat when the valve is closed. Also one or both of the top and bottom layers of the multiple stacked plates 91, denoted 95 and 96 in FIG. 3, can be thicker and/or made of another material, even of non-magnetic material, than the other layers 91. Thus, in accordance with some embodiments the plate facing the outlet port is designed differently from the other plates in the stack of plates 91. In particular an outer plate 95, 96 can be thicker or of another material, even of non-magnetic material, than the other plates of the valve washer. This is advantageous in that the plate facing the outlet port will endure more mechanical stress than the other plates and by letting the plate facing the outlet port have other properties, e.g. higher wear resistance, than the other plates, the expected lifetime of the valve washer and of the valve can be increased, especially if one of or both outer plates, in a further embodiment, would be arranged easily replaceable as an inexpensive spare part item.

Figure 4:
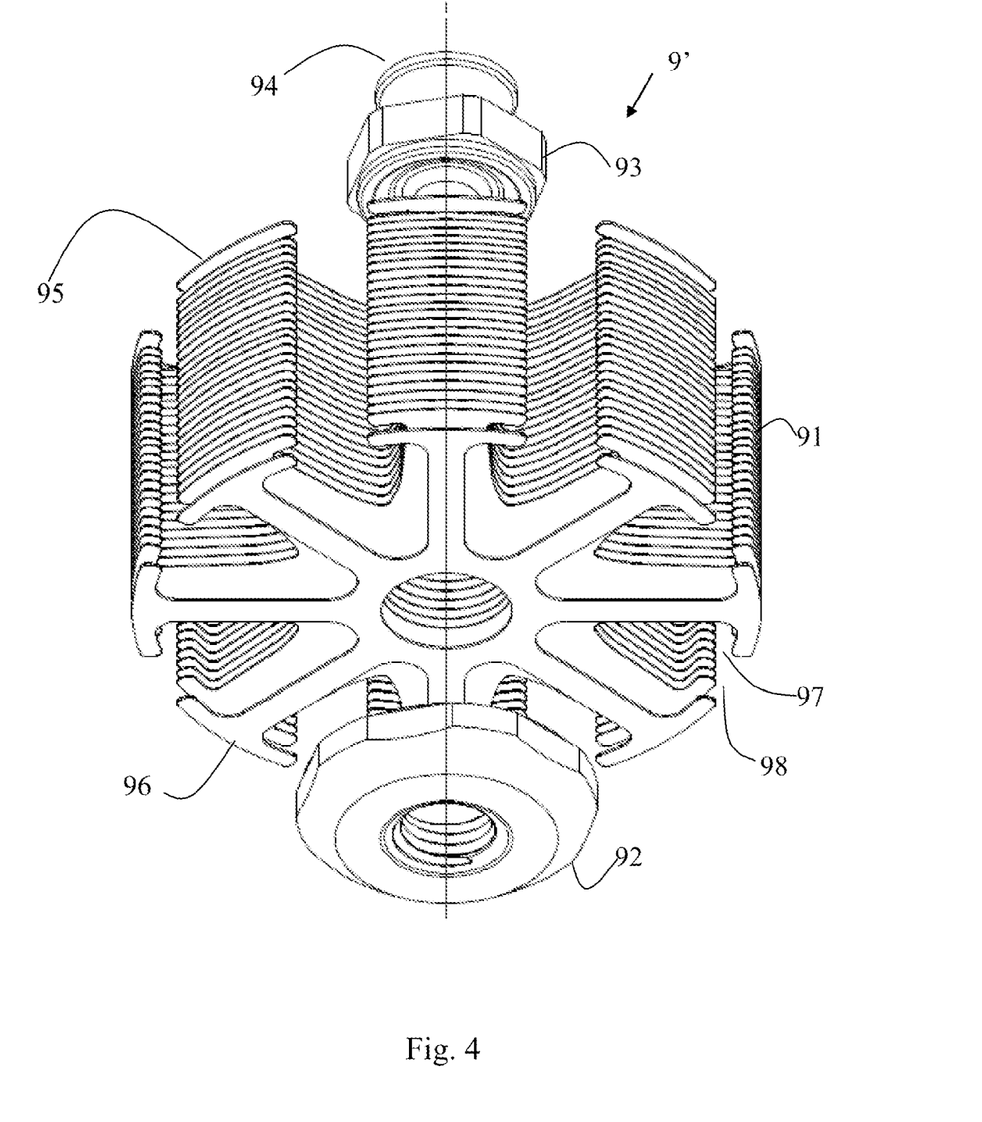
Figure 5:
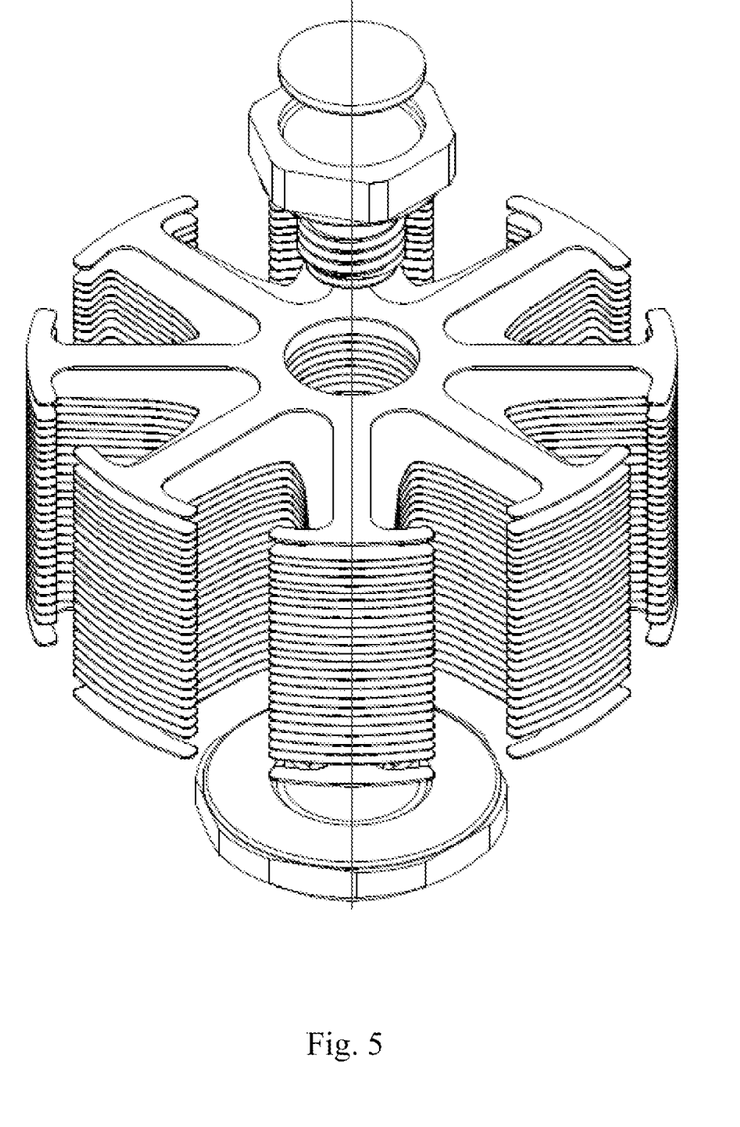

In FIGS. 4 and 5 the valve washer in FIG. 3 is seen as an exploded view in perspective from the top and bottom, respectively. As can be seen in FIGS. 4 and 5 each layer 91 of the valve washer 9' can have a generally circular perimeter and the thickness of a layer 91 is small in relation to the area of the layer. Typical dimensions for a plate in the valve washer can be between 0.2 mm-3 mm thick. In accordance with some embodiments the diameter of the valve washer 9' can be in the range of 10 mm-50 mm.

Further, the number of thin plates 91 forming the valve washer can also vary. In some applications the number of thin plates can range from 2-50. In other applications the number of plates is in the range from 3-40, in particular in the range from 5-20. In some embodiments at least two plates cooperating with each other are essentially identical. The at least two essentially identical plates can be supplemented with outer plates having other dimensions or made of other materials as described herein.

Figure 12A:
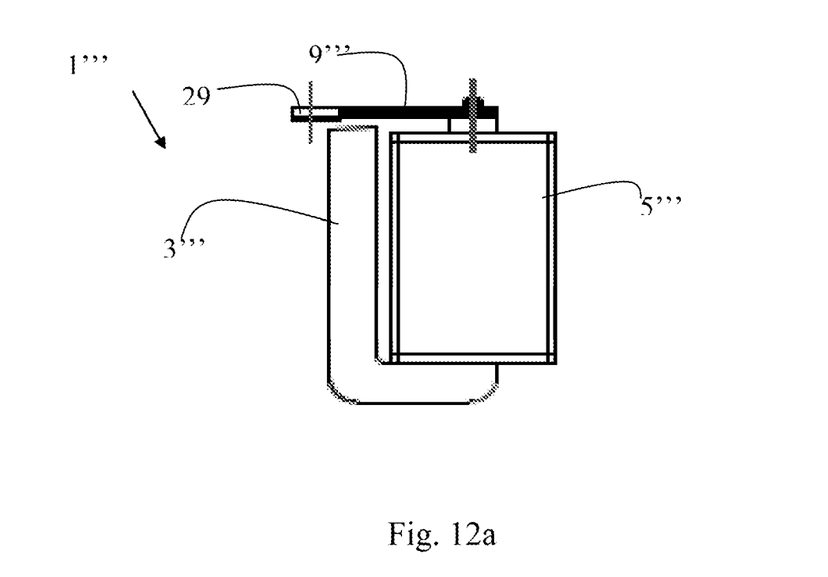
FIGS. 12a-12c illustrate a valve washer according to a third embodiment.
Figure 12B:
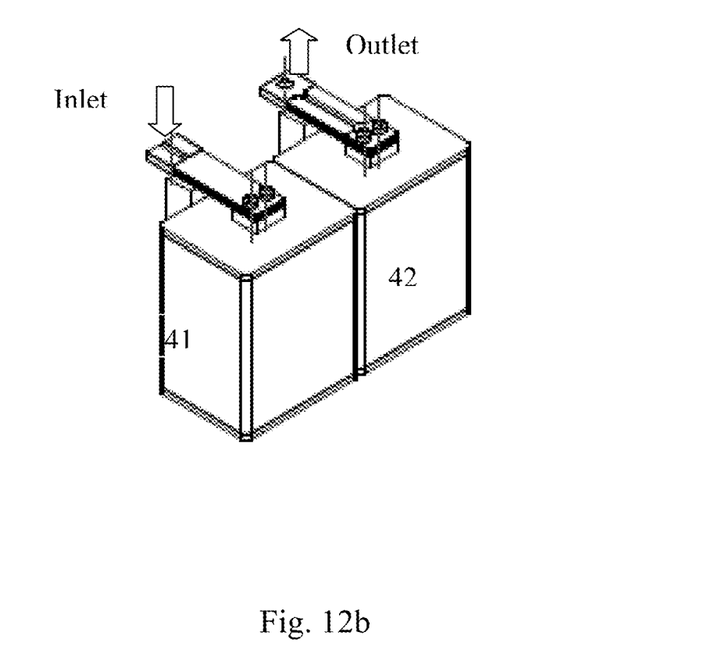
Figure 12C:
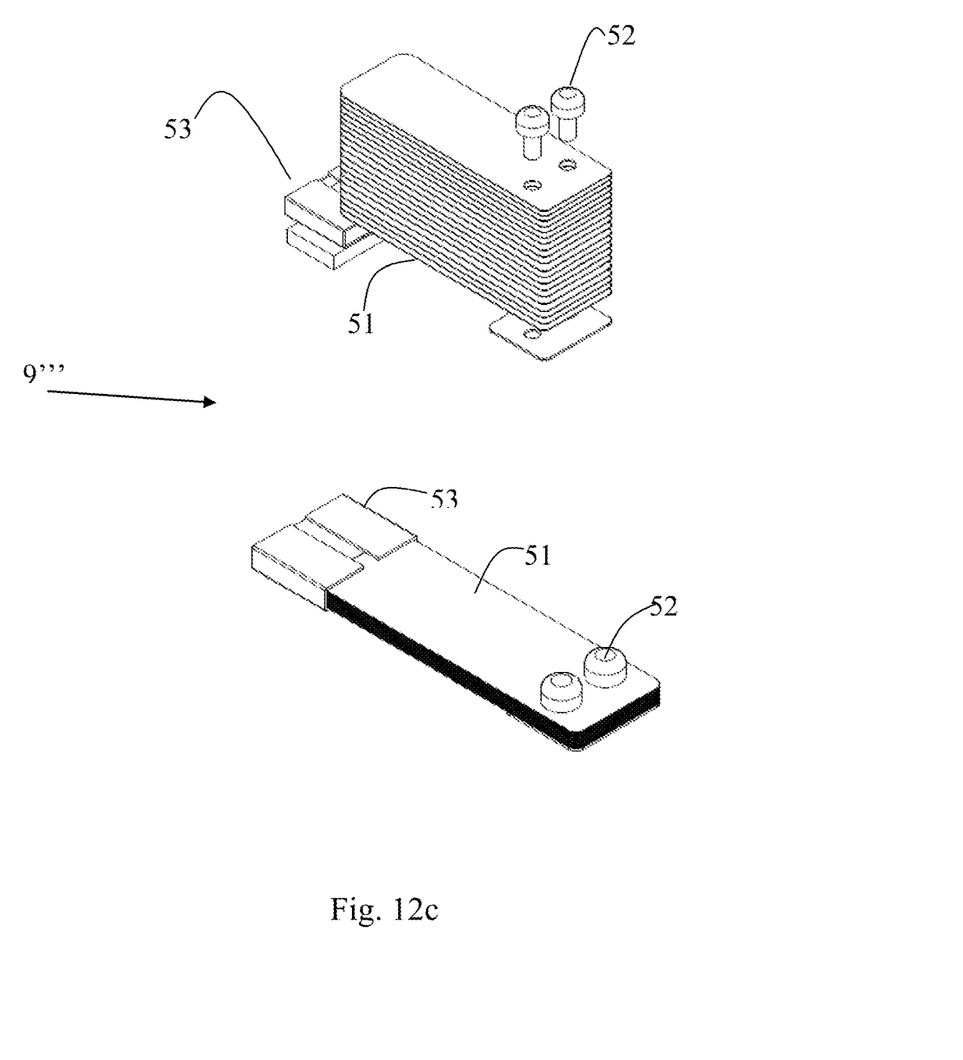

In some embodiments the shape of the plate is another than a generally round/circular shape. For example the periphery of the plates can have a generally rectangular shape, such as in the embodiment described below in conjunction with FIG. 12.

Further, a plate, in particular each plate, can be provided with radially oriented slits 97. The slits can in accordance with one embodiment have a width that increases in a radial direction out towards the perimeter edge of the plates. The slits 97 can in accordance with one embodiment extend all the way to the periphery of the plates. In accordance with some embodiments the slits are shaped such that the width of the slits decreases at the periphery of the plates. This will form a valve washer having a number of T-shaped tongues extending from a central section and forming an essentially circular valve washer. In particular the outer plates can have the T-shaped tongues. The T-shaped outer tongues will provide good spring characteristics while keeping the wear surface large. Further, in accordance with some embodiments the top and/or bottom plate 95, 96 of the valve washer can have slits that are shaped different from the slits of the other plates in the valve washer. In particular the slits 98 of an outer layer in the valve washer 9' can be larger, i.e. having a larger area cut out from the plate, than the corresponding slits 97 of the other layers 91. The exact shape of the slits can vary depending on the application. The design of the slits can be used to choose the desired spring characteristics of the valve washer. Also the design of the slits can be used to choose the desired magnetic properties of the valve washer. For example a plate of the valve washer having less material cut out in the slits will have more magnetic material left and will hence be able to carry a higher magnetic flow.

Figure 6:
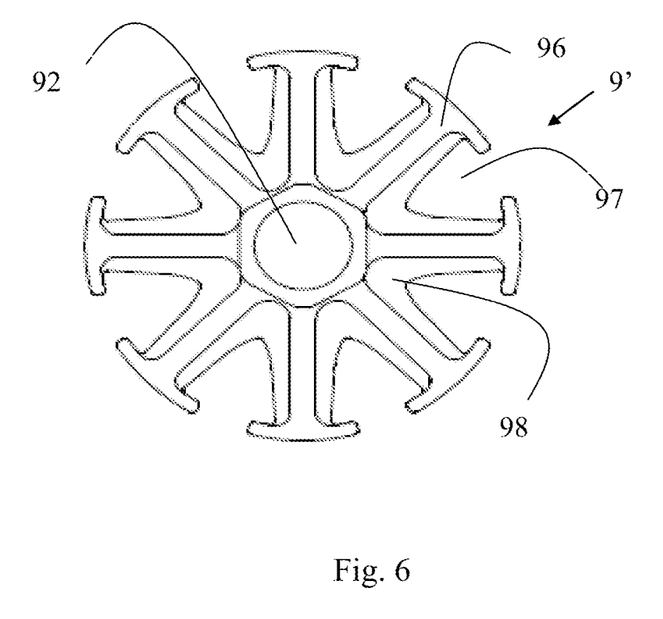
FIGS. 6-9 are views of the valve washer according to the second embodiment.
Figure 7:
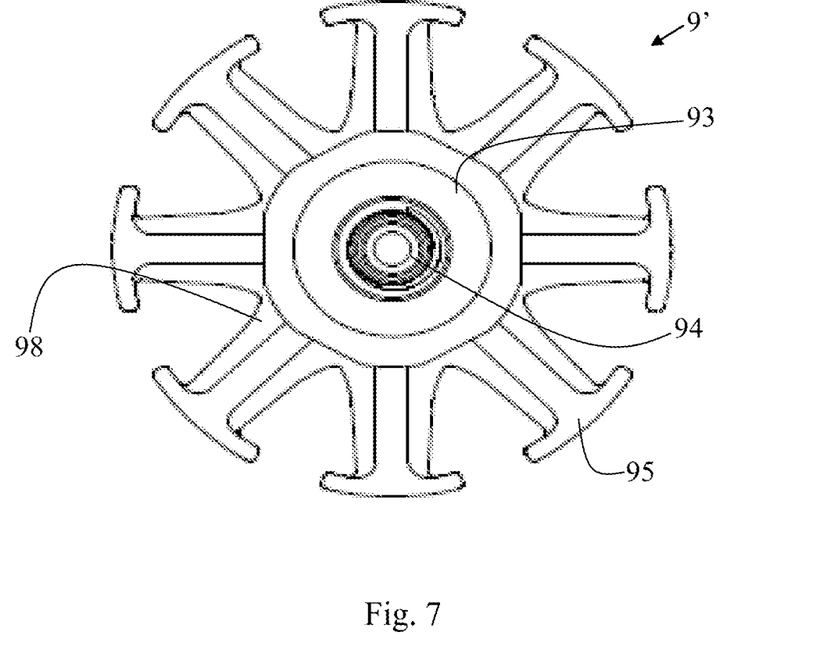

In FIGS. 6 and 7 the valve washer 9' is shown in a top view and a bottom view respectively.

Figure 8:
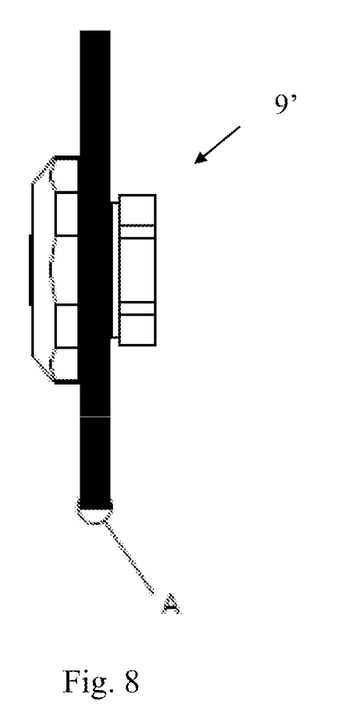
Figure 9:
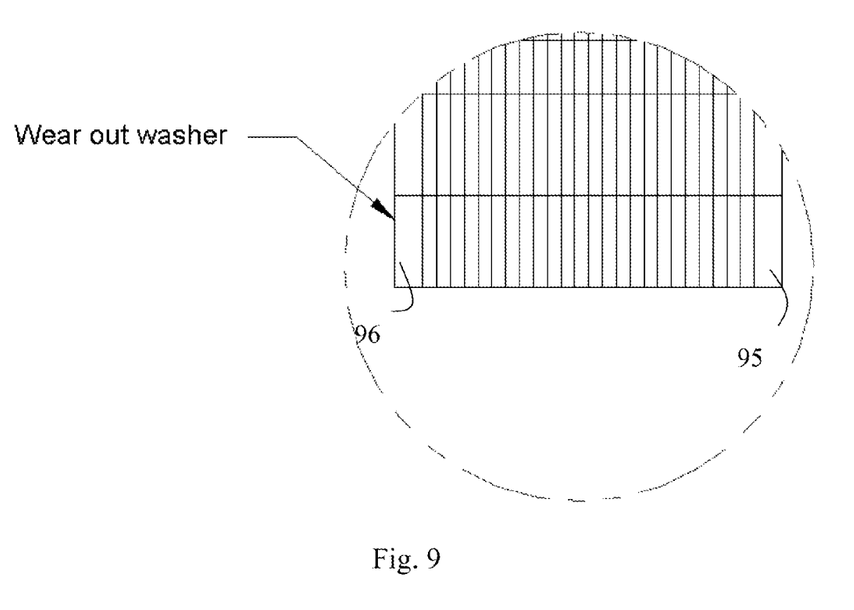

As set out above, in accordance with some embodiments the top and/or bottom plate of the valve washer 9' is given a design different from the other plates. The top and bottom plates can be made thicker and can also be made of another material than the other plates in the valve washer to serve as wear out washers. Also the plates 95 and 96 can increase the stability of the valve washer 9' to facilitate and allow for robust handling of the valve washer 9'. This is depicted in FIG. 8a and FIG. 8b which shows a detail of FIG. 8a. Thus, In FIG. 8b, the outer plates 95 and 96 are thicker than the other plates located in between the plates 95 and 96.

In accordance with one embodiment the plates 91 of the valve washer 9, 9', 9" are secured, as set out above, by means of a bolted joint. In particular there is one bolted joint provided at a central section in all plates that keeps the valve washer together as a single unit that can move in the space between the valve seat and the core. Other methods of securing the individual washers/plates of the valve washer can be envisaged. For example the package of plates forming the valve washer can be clamped or glued together. Regardless of the method used it is typically advantageous to use a securing that allows for a small displacement between individual plates of the valve washer in at least one section of the valve washer. Thus, the plates can then, at least partly, be displaced in relation to each other in at least one direction such as a radial direction. In accordance with one embodiment the plates are secured to each other at a central location, and can be displaced in relation to each other in a radial direction of the plates at an outer section/outer sections of the plates. This allows, outside said securing location, for a small, essentially radial movement in terms of sliding between the individual plates/washers of the freely suspended valve washer, when it is compressed during the excitation phase, respectively de-compressed (spring return) during the de-excitation phase. The radial movement between the individual washers of the valve washer will provide and enhance the desired blade spring characteristics of the valve washer and also contribute to a dampening of the movement of the freely suspended valve washer in the space where it can move freely between two end positions corresponding to a closed and open valve, respectively.

The valve 1 can have other designs using a valve washer 9, 9' and 9" as described herein. Generally, the valve washer 9, 9' 9", is arranged in a space in the valve and moves between two positions in response to a magnetic field generated by an electromagnet. The two positions can correspond to an open and a closed state of the valve. Some different design options will now be described.

Figure 10:
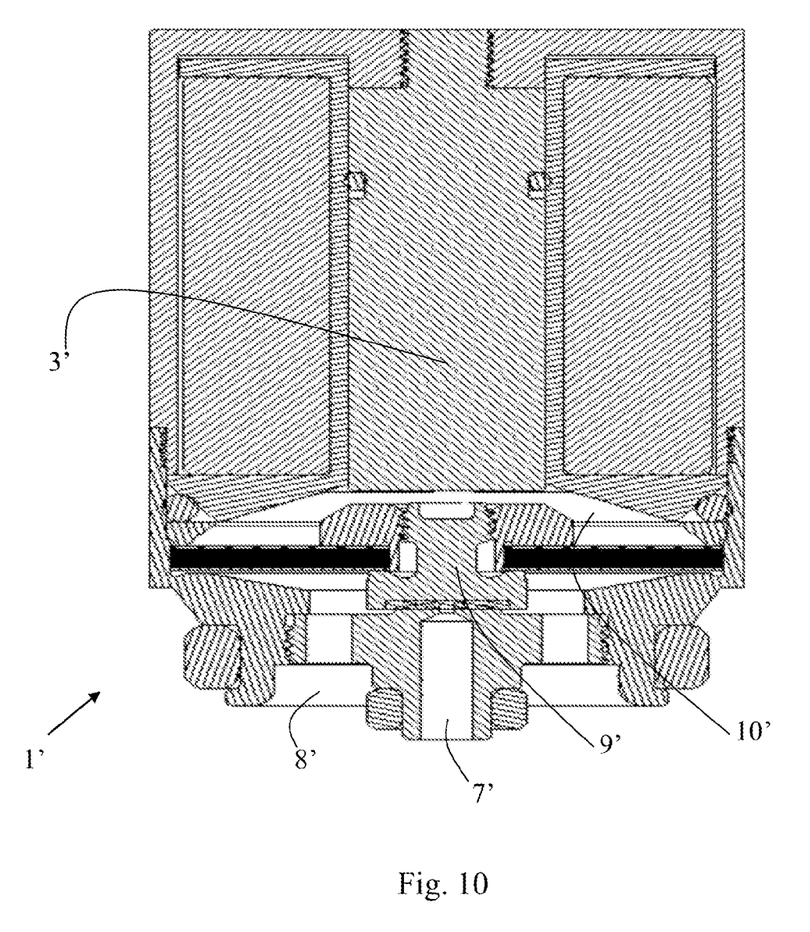
FIGS. 10 and 11 illustrate different types of electromagnetic valves.

In FIG. 10 a valve 1' having a valve washer 9' or 9" as described herein is depicted. The valve washer can move in the space 10' between a valve seat and a core 3'. The valve 1' is of a type that can be labeled "normally closed". Thus, when there is no current supplied to the coil for magnetizing the core 3', the valve washer is suspended in its seat closing the opening 7'. When the core is magnetized, the valve washer moves in the space and opens a channel from the inlet 8 to the outlet 7 so that a flow of, for example, pressurized air can flow through the valve 1'.

Figure 11:
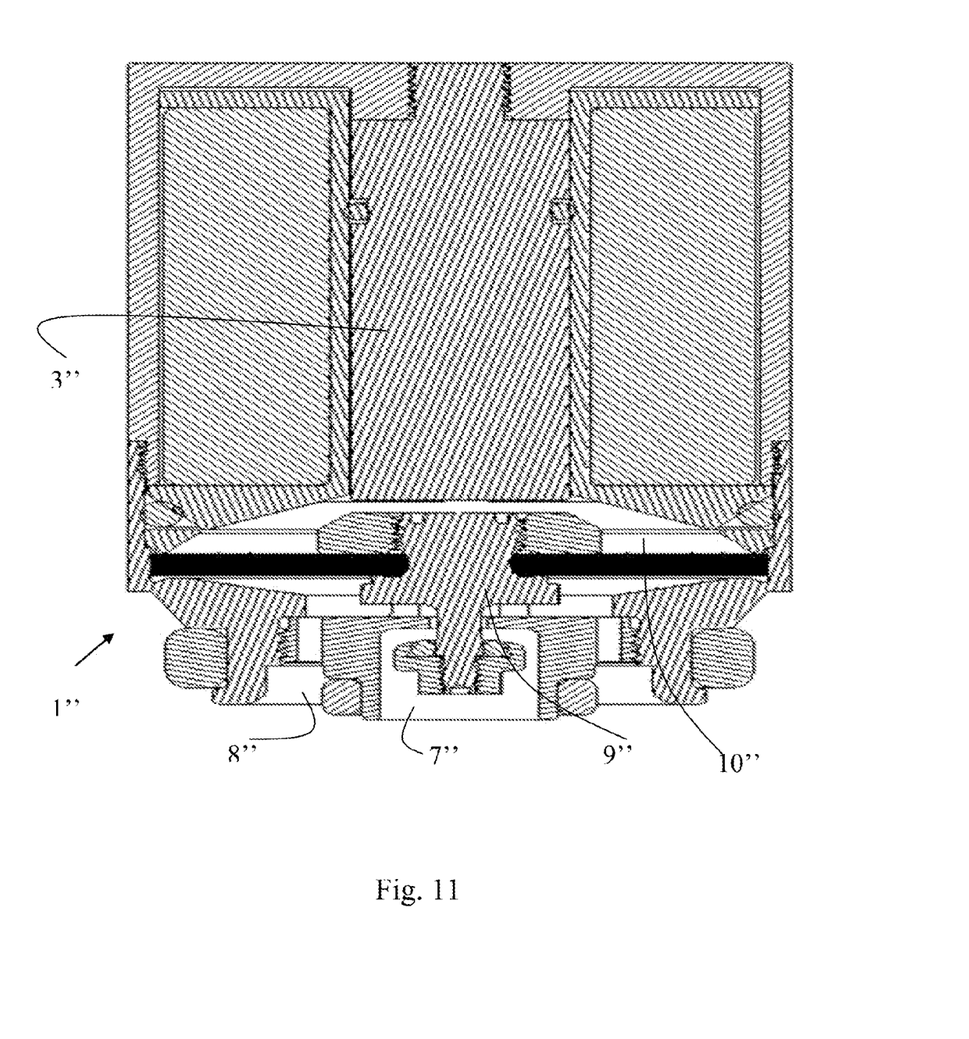

In FIG. 11, a valve 11" similar to the valve 1' is shown. The valve 1" is however of a type that can be labeled "normally open". Thus, when there is no current supplied to the coil for magnetizing the core 3" the valve washer is suspended in a position where the valve washer is in a position with the valve washer away from the valve seat. When the core is magnetized the valve washer in the valve 1" is drawn to the valve seat closing the valve 1".

In FIG. 12a, yet another embodiment of a valve 1'" is depicted. For ease of understanding only parts of the valve'" is depicted in FIG. 12a. The valve comprises in a housing (not shown) a core 3'". The core 3'" can be generally U shaped. The core 3'" can be magnetized by a coil 5'". The coil 5'" can be wound around one leg of a U-shaped core. The valve 1'" further comprises a valve washer 9'". The valve washer 9'" is in one end section attached to the core 3'". In case of a U-shaped core the valve washer 9'" can be attached to an end section of the U-shaped core. Another end section of the valve washer 9'" can be arranged in a space between a valve seat (not shown) and the core 3. In particular the other end section can be provided in close connection to the other end section of a U-shaped core. When the core is magnetized the valve washer cooperates with the core to move the valve washer between two positions. One position when the valve washer is attracted by the core 3'" and another position where the core 3'" is not magnetized and can return to its initial position be means of the spring force provided by the valve washer. The valve washer 9'" can further have an outer end section with a lip 29. The lip can be provided in conjunction with an inlet/outlet (not shown) of the valve 1'". When the valve washer moves between its two positions in response to an excitation current provided to the coil 5'", the lip 29 acts to open/close the inlet/outlet of the valve 1'".

In FIG. 12b a valve 1'" that can control both an inlet and an outlet is shown. Thus, in FIG. 12b a valve arrangement with two valves 41 and 42 both comprising a valve washer arrangement such as the valve washer depicted in FIG. 12a is provided. The inlet is controlled by a first valve 41 and the outlet is controlled by a second valve 42.

In FIG. 12c the valve washer of FIGS. 12a and 12b is shown in more detail. The valve washer 9'" is formed by a number of stacked plates 51. The plates can have a generally rectangular shape. In one section the plates are secured to each other. In one embodiment the plates are secured in an end section. The plates can be secured by means of a bolted joint 52. In one embodiment the stacked plates are bolted directly to the core 3'". In another section, where the stacked plates are not secured to each other, the plates can be displaced in relation to each other in at least one direction. Hereby it is possible to achieve a spring force whereby the valve washer does not need to be suspended but can provide a required spring force in itself to return to a position where the valve washer is not attracted by the core. In accordance with one embodiment the valve washer 9'" has a clamp 53 for restricting, but not entirely preventing, displacement of the individual plates in relation to each other in the other section. In accordance with one embodiment the bolted joint 52 is provided in one end section of the stacked plates and the clamp 53 is provided in the other end section of the stacked plates. The clamp 53 can further be adapted to cooperate with an inlet/outlet to close/open the inlet outlet when the valve washer moves between two positions as a result of the switched magnetisation of the core. The clamp 53 can be provided with a sealing element for providing a good seal when closing an inlet/outlet.

It is to be understood that features described in conjunction with a particular embodiment is not restricted to that particular embodiment. To the contrary the embodiments serve as illustration of different design options only. It is possible to combine features from different embodiments. For example, the valve washer in FIG. 12c can have outer plates of other dimensions or by other materials etc.

Figure 13:
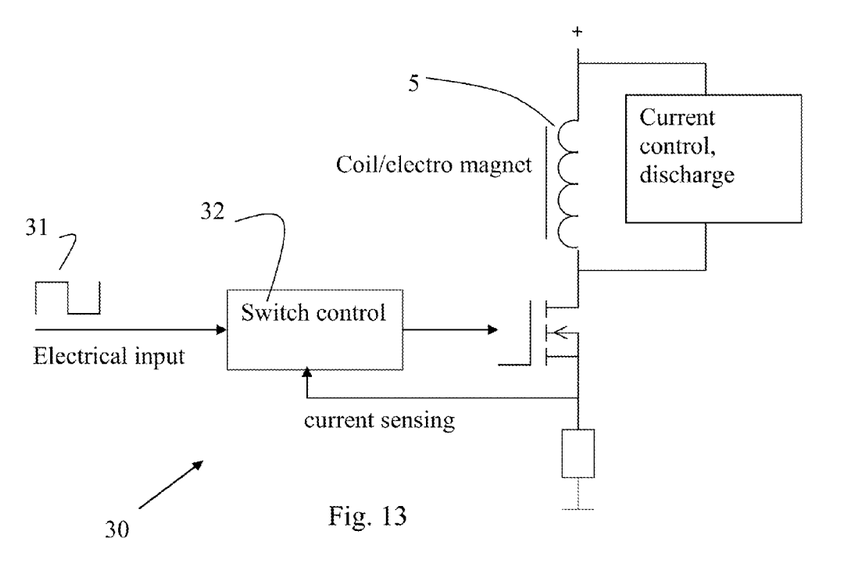
FIG. 13 is a view of a drive circuit for driving an electromagnetic valve.

In FIG. 13 a drive circuit 30 for providing an efficient drive current for driving the valve 1, is shown. The drive circuit 30 comprises an input terminal 31 supplying an input signal. The drive circuit 30 provides a drive current for the electromagnetic coil 5. In one embodiment the drive current is provided by a switched current controlled by a control circuit 32 for opening and closing the valve 1. By controlling the switching times the valve 1, can be controlled to let through an appropriate amount of medium flow. The switching can preferably be performed by current sensing switching. The drive circuit hereby can act as a current generator providing a pulse width modulated drive current. The drive circuit can also be used for the valves 1' and 1".

It is advantageous for some applications if the response time for the electromagnetic valve can be made short. This is because a short response time allows for a high switching frequency, a higher resolution and an expanded operational range for the medium flow, which is desired in many applications. In order to achieve a short response time the core 3 can in accordance with one embodiment be made of a magnetic material with a short response time reducing the presence of eddy currents. This can be achieved by manufacturing the core by plates made of an electromagnetic material in multiple layers or using other materials having a short response time such as Somaloy. Also the resistance of the magnetic material can be made high so that the electric conductivity is made low.

Thus, using an electromagnetic valve as described herein a valve having improved properties can be achieved. By providing a plate stack assembly structure having magnetic properties in the valve as described herein, in one and the same element it is possible to achieve an appropriate magnet flow strength and geometry due to the aggregate large cross-sectional area of all the multiple plates in the stack assembly, by which fact a strong and fast forward movement of said element (opening/closing, or vice versa, of the valve) during the excitation phase can be achieved, and at the same time, to achieve an advantageously appropriate spring characteristics in the stack assembly, due to the multiplicity of the thin (and flexible) plates in the stack assembly and their at least partial movability in relation to each other, by which fact an advantageously strong and fast return movement of said element (closing/opening, or vice versa, of the valve) during the de-excitation phase can be achieved.

In addition the stacked assembly will provide good dampening characteristics which is advantageous since the stack assembly does not have to be suspended but can be freely suspended in its working space in the valve.

On the basis of the above-mentioned teachings, the selection of the number, thickness, design and material of the magnetic plates in the stacked assembly forming the valve washer can then be made in dependence on the desired size and strength of the magnetic flow through the package and its desired return spring characteristics, which parameters in turn will depend on the desired force and speed of the valve for the intended field of application.

It will be appreciated that procedures described above are carried out repetitively as necessary. It will also be appreciated that methods and devices described above can be combined and re-arranged in a variety of equivalent ways, and can be include implementation by suitably programmed or configured digital signal processors, general-purpose processors, and/or other known electronic circuits (e.g., discrete logic gates interconnected to perform a specialized function, or application-specific integrated circuits).

Thus, the invention may be embodied in many different forms, not all of which are described above, and all such forms are contemplated to be within the scope of the invention.

The invention claimed is:

1. An electromechanical valve, comprising:
a housing;
a core of magnetic material having a centrally extending portion surrounded by a coil to be supplied with excitation current, wherein the core is cup-shaped with a centrally extending portion to the rim of the cup-shaped core;
a valve seat attached to the housing with a space to the core;
at least one centrally located outlet port in the valve seat and at least one inlet port communicating via the space, wherein the at least one inlet port is located radially from the at least one outlet port in the valve seat;
a valve washer of magnetic material suspended in the space to close the outlet port in absence of excitation current to the coil, the valve washer cooperating with the core to open the outlet port when excitation current is supplied to the coil, and the valve washer being formed by multiple layers of electromagnetic material cooperating to provide a spring force when the valve washer is compressed, wherein the valve washer has a stroke less than or equal to 2 millimeters in the space; the multiple layers have substantially the same size and include top and bottom wear-out layers and a plurality of intermediate layers between the top and bottom wear-out layers; and each of the top and bottom wear-out layers and intermediate layers have substantially the same overall shape; and
a drive circuit coupled to the coil for providing a pulse-width-modulated drive current for exciting the coil.

2. An electromechanical valve, comprising:
a housing;
a core of magnetic material surrounded by a coil to be supplied with excitation current;
a valve washer of magnetic material arranged in a space between a valve seat and the core to open/close the valve in response to the excitation current supplied to the coil, wherein the valve washer is formed by multiple stacked plates cooperating to provide a spring force when the valve washer is compressed, the plates being at least partially displaceable in relation to each other in at least one direction, wherein the valve washer is formed by generally circular plates, a top plate and a bottom plate having a form of T-shaped tongues and intermediate plates provided between with corresponding radially oriented arms.

3. The valve of claim 2, wherein the plates have a thickness of 0.2 millimeter-3 millimeters.

4. The valve of claim 2, wherein the plates have a diameter of 10 millimeters-50 millimeters.

5. The valve of claim 2, wherein a number of plates is in a range of 2-50 plates.

6. The valve of claim 2, wherein at least one of the top plate and bottom plate is made of another material than the other plates.

7. The valve of claim 2, wherein at least one of the top plate and bottom plate has a shape that is different from the other plates.

8. The valve of claim 2, wherein the valve washer is suspended in the space.

9. An electromechanical valve, comprising:
a housing;
a core of magnetic material surrounded by a coil to be supplied with excitation current;
a valve seat attached to the housing with a space to the core;
at least one outlet port in the valve seat and at least one inlet port communicating via the space; and
a valve washer of magnetic material arranged in the space to open/close the valve in response to excitation current supplied to the coil, wherein the valve washer is formed by multiple stacked plates, the plates being provided with radially oriented slits and cooperating to provide a spring force when the valve washer is compressed.

10. The valve of claim 9, wherein a width of the slits increases in a radial direction toward a perimeter edge of the plates.

11. The valve of claim 9, wherein the slits extend to a perimeter of the plates.

12. The valve of claim 9, wherein at least one of a top plate and a bottom plate has slits that are differently shaped than slits of the other plates.

13. The valve of claim 12, wherein at least one of the top plate and the bottom plate has slits that are larger than slits of the other plates.

* * * * *